US010431255B2

(12) United States Patent
Sato et al.

(10) Patent No.: US 10,431,255 B2
(45) Date of Patent: Oct. 1, 2019

(54) MAGNETIC-TAPE STORAGE APPARATUS

(71) Applicant: UNITEX CORPORATION, Tokyo (JP)

(72) Inventors: Hiromitsu Sato, Tokyo (JP); Takahiro Tsuchida, Tokyo (JP); Emi Kosugi, Tokyo (JP)

(73) Assignee: UNITEX CORPORATION, Tokyo (JP)

( * ) Notice: Subject to any disclaimer, the term of this patent is extended or adjusted under 35 U.S.C. 154(b) by 245 days.

(21) Appl. No.: 15/531,075

(22) PCT Filed: Apr. 4, 2016

(86) PCT No.: PCT/JP2016/060997
§ 371 (c)(1),
(2) Date: May 26, 2017

(87) PCT Pub. No.: WO2017/175264
PCT Pub. Date: Oct. 12, 2017

(65) Prior Publication Data
US 2018/0190318 A1   Jul. 5, 2018

(51) Int. Cl.
*G11B 15/68* (2006.01)
*G11B 15/07* (2006.01)
(Continued)

(52) U.S. Cl.
CPC ............ *G11B 15/684* (2013.01); *G11B 15/07* (2013.01); *G11B 15/1883* (2013.01);
(Continued)

(58) Field of Classification Search
None
See application file for complete search history.

(56) References Cited

U.S. PATENT DOCUMENTS 4,677,508 A  *  6/1987  Barton, Jr. ........... G11B 5/5504
                                                   360/251.1
5,323,327 A  *  6/1994  Carmichael ............ B25J 9/1692
                                                   700/215
(Continued)

FOREIGN PATENT DOCUMENTS

JP    01-150291 A    6/1989
JP    05-081786 A    4/1993
(Continued)

OTHER PUBLICATIONS

International Search Report for corresponding International Application No. PCT/JP2016/060997 dated Jul. 5, 2016.

*Primary Examiner* — Tan X Dinh
(74) *Attorney, Agent, or Firm* — Renner, Otto, Boisselle & Sklar, LLP

(57) ABSTRACT

A magnetic-tape storage apparatus having a simple structure and being able to surely store magnetic tapes on each of which valuable data are recorded and the recorded data on them at a low cost and over a long period in a small space, a magnetic-tape storage apparatus comprises a housing, a cartridge storage part, a magnetic tape drive, a cartridge transfer device [18] to selectively transfer a plurality of cartridges stored in the cartridge storage part to the magnetic tape drive and to return to the original position, a cartridge data reading device to selectively and contactlessly read data retained in each memory chip of the cartridges stored in the cartridge storage part and a computer to control them and to rewind the cartridges timely.

4 Claims, 13 Drawing Sheets

(51) Int. Cl.
   *G11B 15/18*   (2006.01)
   *G11B 23/04*   (2006.01)
   *G11B 33/14*   (2006.01)

(52) U.S. Cl.
   CPC ........ *G11B 15/6835* (2013.01); *G11B 23/042* (2013.01); *G11B 33/1446* (2013.01)

(56) References Cited

U.S. PATENT DOCUMENTS

| | | | | |
|---|---|---|---|---|
| 6,034,926 | A * | 3/2000 | Dang | G11B 15/6885 369/30.34 |
| 7,719,782 | B1 | 5/2010 | Bates et al. | |
| 2002/0191322 | A1* | 12/2002 | Jerman | G11B 15/07 360/69 |
| 2004/0012876 | A1* | 1/2004 | Tahara | G11B 15/07 360/69 |
| 2005/0065648 | A1* | 3/2005 | Sasaki | G11B 15/68 700/245 |
| 2005/0169126 | A1* | 8/2005 | Wakelin | G11B 15/68 369/30.38 |
| 2005/0190660 | A1* | 9/2005 | Wakelin | G11B 15/689 369/30.27 |
| 2006/0077585 | A1* | 4/2006 | Larson | G11B 15/07 360/69 |
| 2008/0198022 | A1* | 8/2008 | Battles | B41M 5/52 340/572.8 |
| 2010/0161895 | A1* | 6/2010 | Qualls | G06F 12/1408 711/111 |
| 2010/0202083 | A1* | 8/2010 | Bui | G11B 5/00813 360/78.02 |

FOREIGN PATENT DOCUMENTS

| | | |
|---|---|---|
| JP | 05-266536 A | 10/1993 |
| JP | 2000-260089 A | 9/2000 |
| JP | 3237191 B2 | 10/2001 |
| JP | 2003-331408 A | 11/2003 |
| JP | 2005-093000 A | 4/2005 |
| JP | 2006-164445 A | 6/2006 |
| JP | 2006-209937 A | 8/2006 |
| JP | 2008-135088 A | 6/2008 |
| JP | 2009-223964 A | 10/2009 |

* cited by examiner

MAGNETIC-TAPE STORAGE APPARATUS

FIELD OF THE INVENTION

The present invention relates to a magnetic-tape storage apparatus.

BACKGROUND OF THE INVENTION

In a case that a cartridge holding a wound magnetic tape on which valuable data are recorded has been stored without using for a long period, a property of the magnetic tape is sometimes deteriorated. In the worst case, the recorded data are missing, are deteriorated or cannot be taken out.

As a first factor of the property deterioration, it is considered that a water vapor (moisture) absorbing chemical substances and dust in an air attaches to the magnetic tape, and it causes a growth of mold or a deterioration of the tape.

As a second factor of the property deterioration, it is considered that because an inside part of the wound magnetic tape is wound by an outside part of it to be pressed with a strong physical pressure, interfaces of the tape are stuck to each other, a material attached to a surface of the tape is pressed into it, or a base material of the tape is physically elongated and compressed, etc.

As means for preventing such a property deterioration of the magnetic tape, the following are exemplified: a means for discriminating a tape which has passed a certain period from the last rewinding and performing rewinding of the discriminated tape (see Patent Literature 1); a means for discriminating necessity of maintenance or exchange when an error rate exceeds a predetermined threshold by calculating the error rate based on information read by an information reading means of a magnetic tape (see Patent Literature 2); a means for determining a cleaning stage of a magnetic head based on an error frequency information which is the same as the above error rate (see Patent Literature 3); a means for controlling a Peltier element when a humidity detected by a temperature humidity sensor exceeds a predetermined value so that a temperature in a humidity controlling part rises (see Patent Literature 4), etc.

PRIOR ART

Patent Literatures

Patent Literature 1: JP 3,237,191 B
Patent Literature 2: JP 2006-164445 A
Patent Literature 3: JP 2003-331408 A
Patent Literature 4: JP 2009-223964 A

SUMMARY OF THE INVENTION

Objects of the Invention

The above mentioned conventional means can achieve respective objects to a certain degree. However, they are insufficient for storing a magnetic tape and recorded data on it in a long period, in other words, for storing them semi-permanently. Moreover, there exist problems that they require much cost for performing, or large-sized facilities, etc.

In view of the above disadvantages of the conventional techniques, an object of the present invention is to provide a magnetic-tape storage apparatus having a simple structure and being able to surely store magnetic tapes on each of which valuable data are recorded and the recorded data on them at a low cost and over a long period in a small space.

Means for Solving the Problems

The above problems are solved by the present invention as follows.

(1) A magnetic-tape storage apparatus comprises
   a housing;
   a cartridge storage part provided in the housing to store a plurality of cartridges respectively having a wound magnetic tape and a memory chip which can be read contactlessly;
   a magnetic tape drive provided in the housing to perform reading, writing and rewinding of each magnetic tape of the cartridges;
   a cartridge transfer device provided in the housing to selectively transfer each of the cartridges stored in the cartridge storage part to the magnetic tape drive and to return the transferred cartridge to an original position;
   a cartridge data reading device disposed on the cartridge transfer device to selectively and contactlessly read data retained in each memory chip of the cartridges stored in the cartridge storage part; and
   a controller provided to the housing to control the magnetic tape drive and the cartridge transfer device so that a cartridge requiring rewriting is found based on the data read by the cartridge data reading device, and that a magnetic tape of the found cartridge is rewound;
wherein each memory chip of the cartridges retains a rewinding history of the corresponding cartridge.

According to such a formation, the cartridge transfer device is activated timely or at a predetermined period, the data retained in each memory chip of the cartridges stored in the cartridge storage part are contactlessly read by the cartridge data reading device disposed on the cartridge transfer device, the cartridge requiring rewinding is found by the controller based on the data, then the cartridge is transferred to the magnetic tape drive by this cartridge transfer device, and the magnetic tape in tins cartridge is automatically rewound.

Because of this rewinding, an accumulated stress of each magnetic tape in the cartridges is released, each of the magnetic tapes is activated by temporally exposed to an atmosphere in the housing, and a durability of each of the magnetic tapes is increased.

Therefore, the magnetic tapes on each of which valuable data are recorded, and the recorded data on them can be surely stored at a low cost and over a long period in a small space.

Moreover, because the cartridge data reading device can contactlessly read the data retained in each memory chip of the cartridges, it can read the information of each memory chip of the cartridges efficiently and quickly without inserting/removing each of the cartridges into/from the storage places.

(2) Regarding the above item (1), wherein a static-elimination-ion feeder is provided to the housing, the static-elimination-ion feeder supplying an air including static elimination ions to an atmosphere at a running part of a running magnetic tape pulled out from a cartridge under rewinding when each magnetic tape of the cartridges is rewound.

According to such a formation, it can prevent an influence by a static electricity generated at the time of rewinding of the magnetic tapes. Thus, it can prevent a harmful effect on the data recorded on each of the magnetic tapes by the static electricity, and an attachment of undesirable fine particles such as dust on the magnetic tape.

(3) Regarding the above item (1) or (2), wherein the magnetic tape drive has functions to perform checking errors of each of the magnetic tapes and to retain each error check history into each memory chip of the cartridges in which each of the magnetic tapes checked regarding errors is held, wherein the cartridge data reading device selectively and contactlessly reads the error check history retained in each memory chip of the cartridges, and wherein the controller has a rewriting stage discriminator discriminating that an error rate included in the error check history read by the cartridge data reading device exceeds a predetermined threshold and outputting discrimination information.

According to such a formation, by discriminating that the error rate included in the error check history exceeds the predetermined threshold, it is possible to know that the corresponding magnetic tape is in a state of requiring a maintenance or exchange.

(4) Regarding the above item (3), wherein at least two pieces of the magnetic tape drive are provided in the housing, and wherein a rewrite controller for controlling the cartridge transfer device and said at least two pieces of the magnetic tape drive is provided to the controller so that a cartridge holding a magnetic tape of which an error check history exceeds a predetermined threshold is mounted to one of the magnetic tape drives based on the information of the rewriting stage discriminator, that an unused cartridge previously stored in the housing is mounted to another magnetic tape drive, and that the data of the magnetic tape read by said one of the magnetic tape drives are written into a magnetic tape of the unused cartridge mounted to said another magnetic tape drive.

According to such a formation, before data recorded on a magnetic tape are deteriorated to an unusable state due to increasing of the error rate of the magnetic tape, a recording medium is renewed by rewriting the data on a magnetic tape of an unused new cartridge. Thus, it is possible to retain the data in a long period beyond a lifetime of the magnetic tape.

(5) Regarding the above item (4), wherein the rewrite controller has a means for retaining the data retained in a memory chip of the cartridge holding the magnetic tape of which the error check history exceeds the predetermined threshold into a memory chip of the unused cartridge as information of the former generation.

According to such a formation, it is possible to exactly know an increasing state of the error rate retroactively to the cartridge before rewriting.

(6) Regarding any one of the above items (1) to (5), wherein a gate for inserting/extracting a cartridge is provided to the housing, and wherein the cartridge transfer device has functions to transfer a cartridge inserted through the gale from outside to the cartridge storage part or the magnetic tape drive, and to transfer a cartridge stored in the cartridge storage part or mounted on the magnetic tape drive to the gate so as to be extracted to outside.

According to such a formation, the cartridge stored in the cartridge storage part in the housing can be inserted into/removed from the housing and can be exchanged as necessary, the original cartridge of which the data have been rewritten can be removed from the magnetic tape drive or the cartridge storage part and can be extracted from the housing, and the unused new cartridge can be inserted into the magnetic tape drive or the cartridge storage part in the housing from outside of the housing.

(7) Regarding any one of the above items (1) to (6), wherein the cartridge storage part stores the cartridges aligned in the left-right direction on a base plate, wherein the cartridge transfer device comprises a slide frame directed in the front-rear direction and provided in the housing so as to move in the left-right direction above or below the cartridges stored in the cartridge storage part, a left-right moving device moving the slide frame in the left-right direction, a slider mounted on the slide frame so as to move in the front-rear direction, a front-rear moving device moving the slider in the front-rear direction along the slide frame, an engaging member disposed on the slider and selectively engaging with/disengaging from a concavity formed on the top face of each of the cartridges stored in the cartridge storage part, an engaging/disengaging driving device moving the engaging member between an engaged position at which the engaging member engages with the concavity of each of the cartridge and an disengaged position at which the engaging member disengages from the concavity, and a moving receiving member integrally formed with the slide frame so as to be positioned behind the base plate, and receiving a cartridge moved to behind the base plate by engaging the engaging member with the concavity, and wherein the cartridge data reading device on the slide frame is disposed at a position facing to a memory chip of the cartridges stored in the cartridge storage part.

According to such a formation, the engaging member engages with the concavity provided on each of the cartridges, the front-rear moving device moves the engaging member backward together with the slider, each of the cartridges can be easily transferred from the base plate to the moving receiving member, and each of the cartridges can be transferred in the left-right direction by moving the slide frame in the left-right direction with the use of the left-right moving device in the state that each of the cartridges is moved to the moving receiving member.

Moreover, each of the cartridges mounted on the moving receiving member can be easily and quickly transferred to the base plate of the cartridge storage part by moving the engaging member forward together with the slider with the use of the front-rear moving device in the state that the engaging member engages with the concavity of the cartridge.

Moreover, it is possible to simplify a structure of the cartridge transfer device and to reduce the manufacturing cost of it.

(8) Regarding the above item (7), wherein the engaging member has a shaft directed in the front-rear direction and an engaging pawl projecting from an end of the shaft perpendicularly to the shaft, and wherein the engaging pawl can rotate between the engaged position at which it engages with the concavity provided on each of the cartridges and the disengaged position at which it disengages from the concavity of each of the cartridges by rotating the shaft with the use of the engaging/disengaging driving device.

According to such a formation, it is possible to simplify a structure of the engaging member, to manufacture it at a low-cost, and to simplify the operation of it.

(9) Regarding the above item (8), wherein the magnetic tape drive is disposed behind the moving receiving member in the housing so that the cartridge mounting port is directed forward, wherein the engaging member has a pressing pawl projecting from another end of the shaft perpendicularly to the shaft so that it forms an angle of 90° or more to the engaging pawl around the shaft, and wherein the engaging/disengaging driving device rotates the engaging member in the state that the engaging pawl disengages from the concavity of the cartridge to the pressing position at which the pressing pawl can come into contact with the front face of the cartridge.

According to such a formation, after the cartridge mounted on the moving receiving member is aligned with the cartridge mounting port of the magnetic tape drive, the slider is moved backward in the state that the engaging pawl of the engaging member engages with the concavity of the cartridge, and thus the cartridge can be inserted into the cartridge mounting port of the magnetic tape drive until the engaging pawl of the engaging member comes into contact with or comes close to the front face of the magnetic tape drive. Then, the cartridge can be deeply inserted into the cartridge mounting port of the magnetic tape drive by rotating the engaging member to the pressing position with the use of the engaging/disengaging driving device such that the pressing pawl is opposite Lo the front face of the cartridge, and by moving the slider backward further in that state.

Moreover, it is possible to prevent the cartridge from getting out from the cartridge mounting port by keeping the pressing pawl of the engaging member to stop at the position where it comes into contact with or comes close to the cartridge mounting port after inserting the cartridge into the cartridge mounting port of the magnetic tape drive. That is, the pressing pawl functions as a stopper for preventing the cartridge from getting out.

Effect of Invention

According to the present invention, it is possible to provide a magnetic-tape storage apparatus having a simple structure and being able to surely store magnetic tapes on each of which valuable data are recorded and the recorded data on them at a low cost and over a long period in a small space.

EMBODIMENTS OF THE INVENTION

A first embodiment of a magnetic-tape storage apparatus according to the present invention is described with FIGS. 1-13 as follows.

Figure 1:
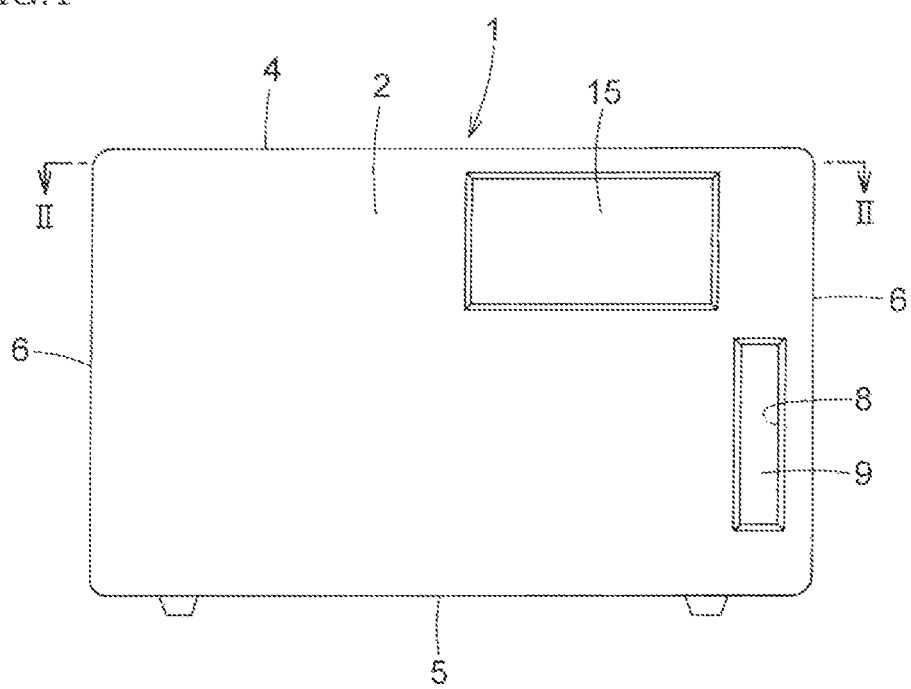
FIG. 1 is a front view showing a first embodiment of a magnetic-tape storage apparatus of the present invention.
Figure 2:
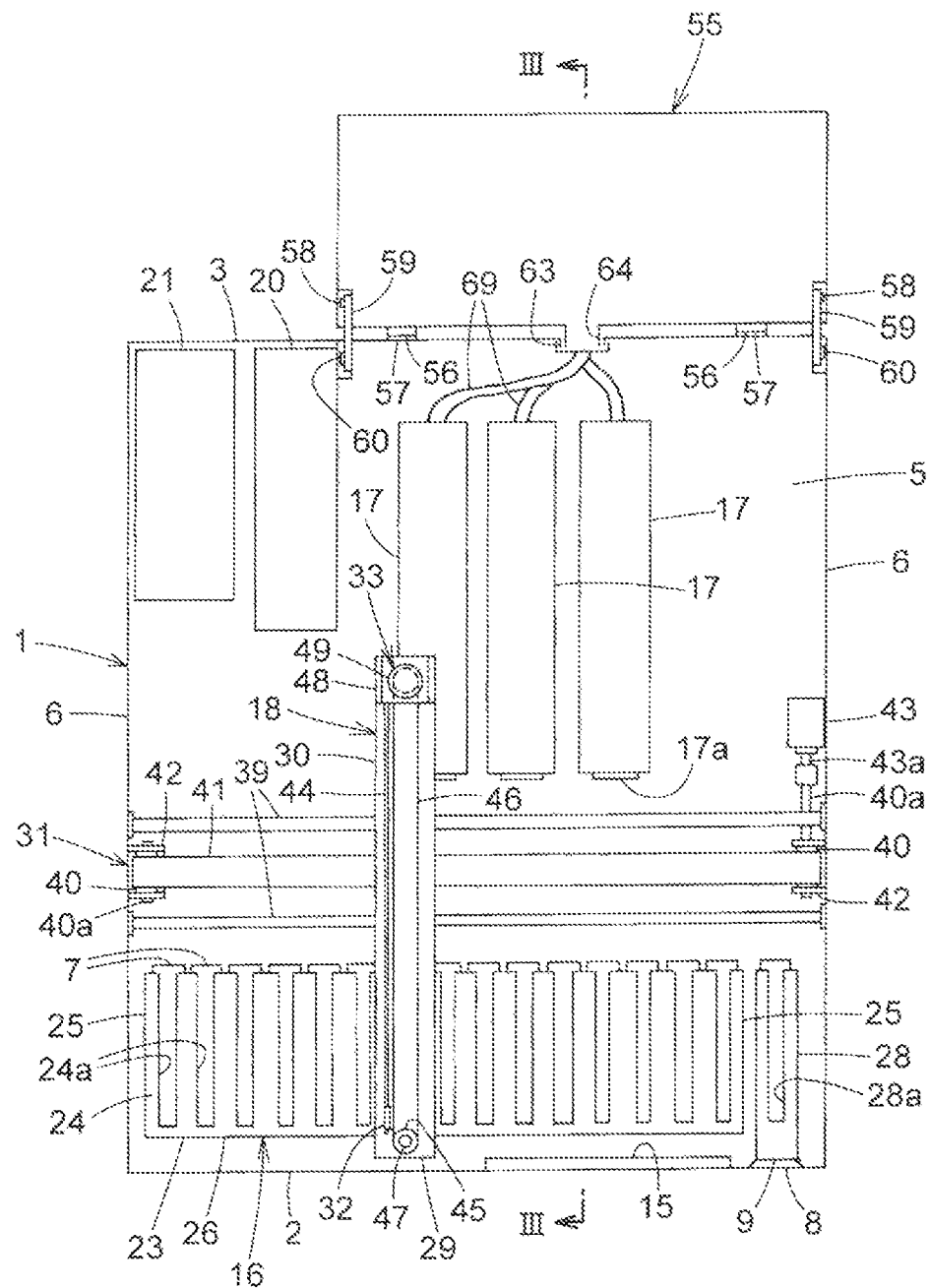
FIG. 2 is a horizontal sectional plan view taken along the line II-II in FIG. 1.
Figure 3:
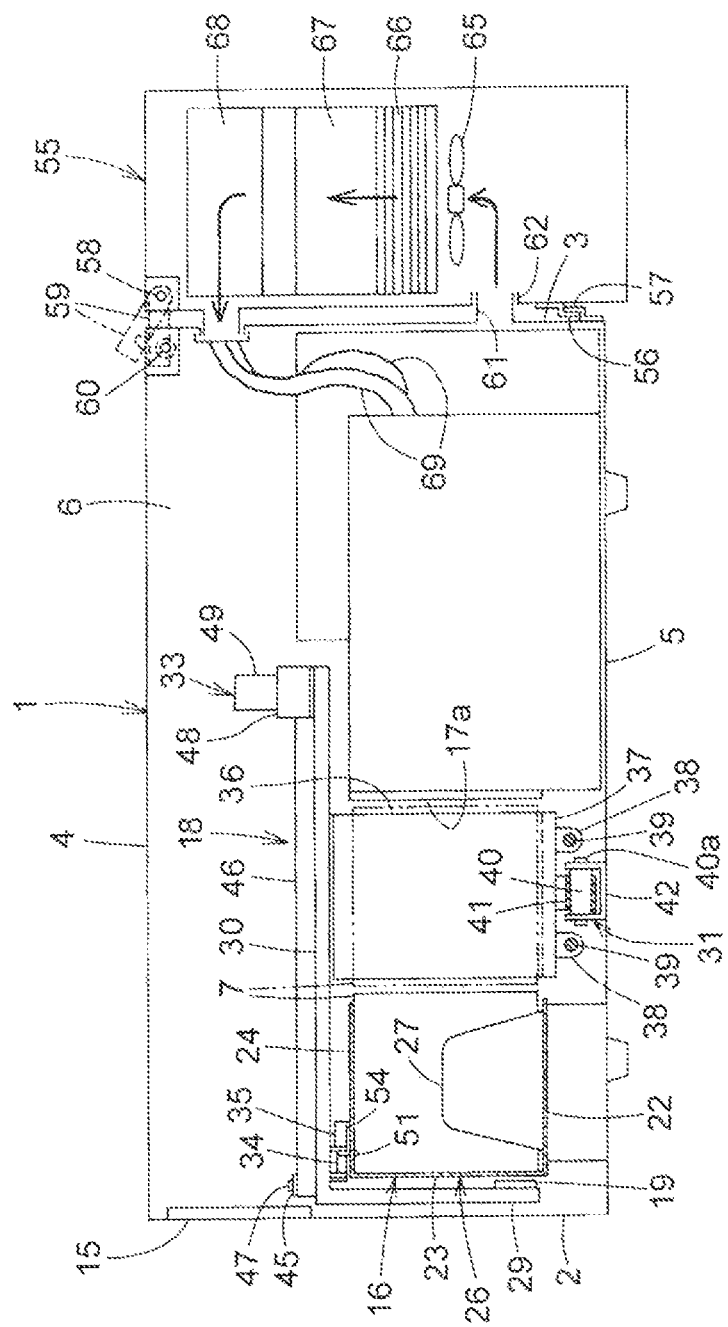
FIG. 3 is a vertical sectional side view taken along the line III-III in FIG. 2.

As shown in FIGS. 1-3, this magnetic-tape storage apparatus has a housing 1 in a sealed box shape. The housing 1 comprises a front plate 2, a rear plate 3, a top plate 4, a base plate 5 and left and right side plates 6, 6.

A gate 8 for inserting/extracting a cartridge 7 is disposed at a lower right part of the front plate 2. This gate 8 is closed with an automatic closing plate 9 except when inserting/extracting a cartridge 7.

Figure 4:
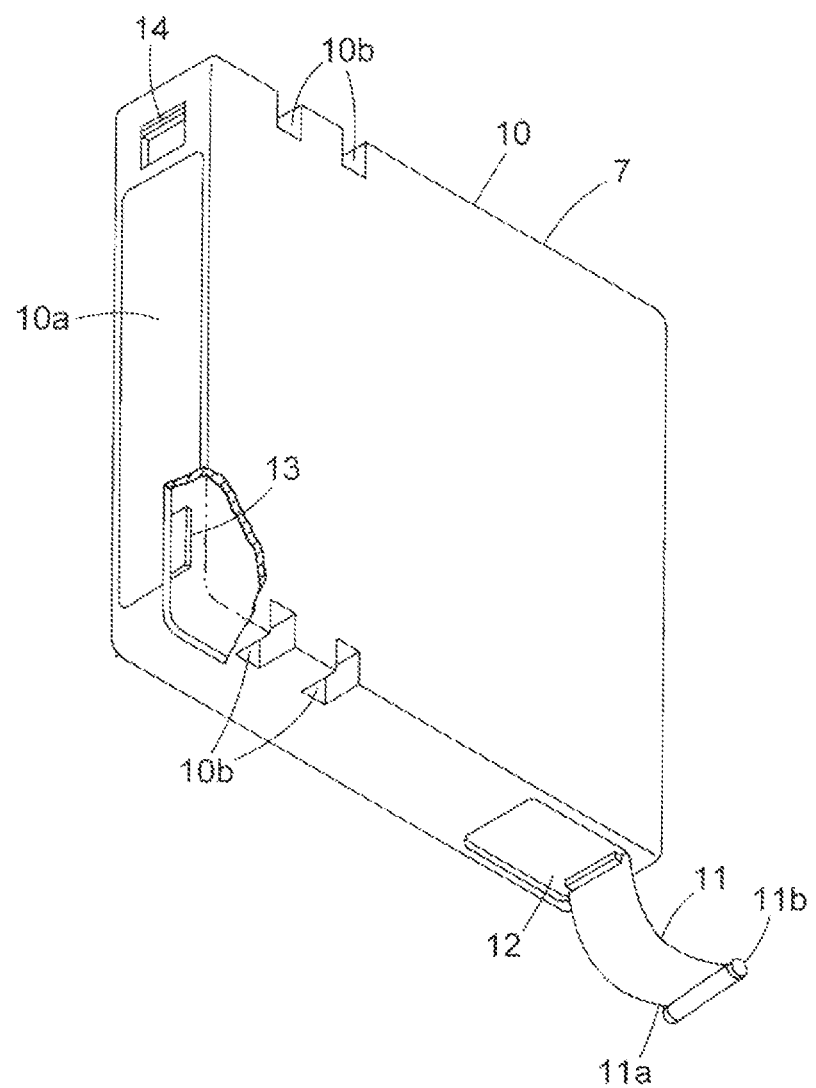
FIG. 4 is a partially cutaway perspective view showing an example of a cartridge intended to be stored in a magnetic-tape storage apparatus of the present invention.
Figure 5:
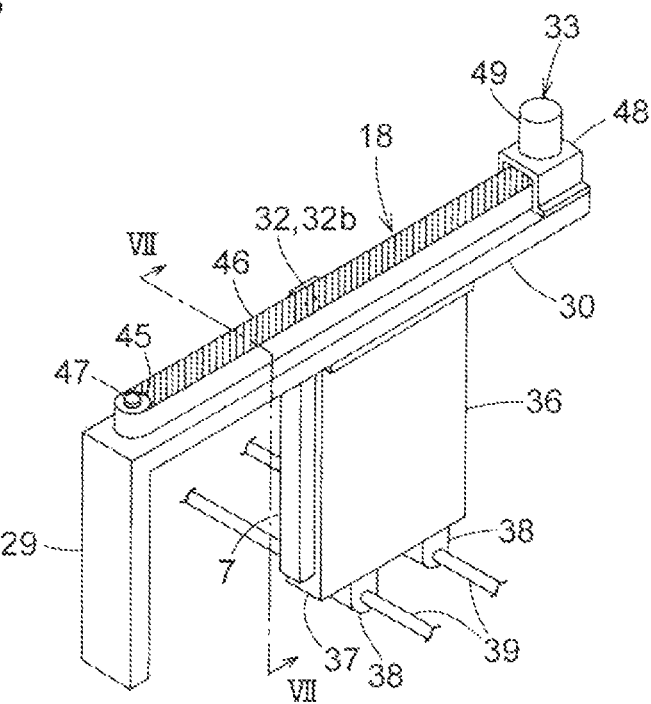
FIG. 5 is a perspective view showing a part of a cartridge transfer device in a state that a slider of the first embodiment is moved to a pulled-out position.

As shown in FIG. 4, a cartridge 7 holds a magnetic tape 11 of LTO (Linear Tape-Open) which is wound on a reel (not shown) in a box-type case 10, and can be used so that a terminal end 11a is pulled out with a reader pin 11b fixed at a tip part of the terminal end from a tape access gate 12 provided on the case 10.

A memory chip 13 capable of contactless reading/writing such as an IC chip is buried under a part of a from face 10a of the case 10, wherein a label is attached to the from face 10a. A write-protect switch 14 for prohibiting writing is provided on the other part of the front face 10a.

When the cartridge 7 is stood up as shown in FIG. 4, two sets of two quadrate concavities 10b, 10b arranged in a front-rear direction are provided on near each from of upper and bottom edges of the case 10 such that they are open on upper and bottom faces and one side face.

As shown in FIG. 1, a control panel 15 comprising a liquid crystal touch panel is arranged at an upper right part of the front plate 2 of the housing 1. All operations are performed by this control panel 15.

As shown in FIGS. 2, 3, in the housing 1, there are provided a cartridge storage part 16 storing a plurality of cartridges 7 aligned in a left-right direction;

a plurality of magnetic tape drives (LTO Drives) 17 reading, writing and rewinding each magnetic tape 11 of the cartridges 7;

a cartridge transfer device 18 selectively transferring each of the cartridges 7 stored in the cartridge storage part 16 to any of the magnetic tape drives 17 and returning it to an original position;

a cartridge data reading device 19 disposed on the cartridge transfer device 18, wherein the cartridge data reading device 19 selectively and contactlessly reads data retained in each memory chip 13 of the cartridges 7 stored in the cartridge storage part 16;

a computer 20 as a controller to control the magnetic tape drive 17 and the cartridge transfer device 18 so that a cartridge 7 requiring rewinding is found based on the data read by the cartridge data reading device 19, and that the magnetic tape 11 of the found cartridge 7 is rewound; and a power supply 21.

Each memory chip 13 of the cartridges 7 retains data such as a date of manufacture of the corresponding cartridge 7, a writing history, a reading history, an erasing history, a rewinding history, an error check history and an error rate thereof, etc. When rewriting (dubbing) data recorded in a magnetic tape 11 of a different cartridge 7 of a former generation, each of the memory chips 13 also retains data which have been retained in a memory chip 13 of the different cartridge 7 (the above different cartridge 7 of a former generation) as information of the former generation.

The cartridge data reading device 19 reads the retained contents in each of the memory chips 13, the computer 20 checks the read data, and each memory chip 13 of the cartridges 7 retains a check history such us check results, a check date, etc. The cartridge data reading device 19 also has a function to write the check history and the other data in the memory chip 13 of the cartridge 7 facing to the reading device 19. Thus, immediately after reading the data of each of the memory chips 13 by facing the cartridge data reading device 19 to each memory chip 13 of the cartridges 7; it is possible directly to write the check results, the check date, etc. into the facing memory chip 13.

The cartridge storage part 16 arranged at a from part of the housing 1 comprises a storage box 26 of which a back side is open and a plurality of partition plates 27, wherein the storage box 26 comprises a horizontal base plate 22 supporting the cartridges 7 so as to be aligned in the left-right direction, a front plate 23 stood up from a from edge of horizontal base plate 22, a top plate 24 directed backward from a top of the front plate 23, and side plates 25, 25 stood up from both sides of the base plate 22, and wherein the partition plates 27 are vertically arranged on the base plate 22 so that the storage box 26 is divided into storage spaces for every cartridge 7 in the left-right direction.

Slits 24a are respectively formed on the storage spaces for the cartridges 7. Every slit 24a extends from the vicinity of the front end of the top plate 24 to the back end so that an engaging pawl 51 of an engaging member 34 described below are inserted.

Elastic engaging pawls (not shown) are preferably provided on the base plate 22 so that when the cartridges 7 are respectively stored in regular storage spaces of the cartridge storage part 16, the elastic engaging pawls prevent the cartridges 7 from a fall-off from the cartridge storage part 16 even if at a time of an earthquake by elastically engaging the pawls with any of the front and rear concavities 10b on each bottom face of the cartridges 7.

A loading box 28 is arranged at one side of the storage box 26 and behind the gate 8 of the front plate 2 in the housing 1. A slit 28a is formed on a top face of this loading box 28, and is the same as slits 24a formed on the top plate 24 of the storage box 26. In another case, this loading box 28 may be integrally formed with the storage box 26.

Three pieces of magnetic tape drive 17 are arranged at a distance of about one piece of the cartridge 7 from the forward storage box 26 in a rear part of the housing 1. One of them may be dedicated for rewinding of each of the magnetic tape 11. Moreover, the number of the magnetic tape drives 17 may be two pieces or four pieces or more.

The magnetic tape drives 17 respectively have a cartridge mounting port 17a on their front lace, and have functions not only to perform reading, writing and rewinding of each magnetic tape 11 of the cartridges 7, but also to perform checking errors of each magnetic tape 11 of the mounted cartridges 7 and to retain each error check history such as an error rate thereof, an error check date, etc. into each memory chip 13 of the cartridges 7 in which each of the magnetic tapes 11 checked regarding errors is held.

Moreover, the magnetic tape drives 17 respectively have functions not only to write information read from a magnetic tape 11 of a cartridge 7 mounted to one of the magnetic tape drives 17 into another magnetic tape 11 of an unused cartridge 7 mounted to another magnetic tape drive 17, that is, to rewrite the data, and to retain an error rale obtained from a comparison between a reading information and a writing information at that time into the memory chip 13 of the unused cartridge 7; but also to retain data retained in the memory chip 13 of the cartridge 7 mounted to the above one of the magnetic tape drives 17 as information of the former generation into the memory chip 13 of the unused cartridge 7.

The cartridge transfer device 18 comprises
a slide frame 30 disposed so as to be directed in the front-rear direction in the housing 1, wherein the slide frame 30 has a front part 29 suspended from the front edge so as to face the front face of the cartridge storage part 16, and moves in the left-right direction above the cartridges 7 stored in the cartridge storage part 16;
a left-right moving device 31 moving this slide frame 30 in the left-right direction;
a slider 32 mounted on the slide frame 30 so as to move in the front-rear direction;
a front-rear moving device 33 moving this slider 32 in the front-rear direction along the slide frame 30;
an engaging member 34 installed on the slider 32 and selectively engaging with/disengaging from any of the concavities 10b formed on the top face of the cartridges 7 stored in the cartridge storage part 16;
an engaging/disengaging driving device 35 moving this engaging member 34 between an engaged position at which the engaging member 34 engages with the concavity 10b of the cartridge 7 and a disengaged position at which the engaging member 34 disengages from the concavity 10b; and
a moving box 36 integrally provided with the slide frame 30, and positioned behind the base plate 22 and before the three pieces of magnetic tape drive 17,
wherein the moving box 36 holds a cartridge 7 which has been moved backward from the base plate 22 by engaging the engaging member 34 with the concavity 10b.

The moving box 36 has a moving receiving member 37 in its lower part, the moving receiving member 37 integrally moving with the slide frame 30 in the left-right direction.

The cartridge data reading device 19 is disposed on the front part 29 of the slide frame 30. The portion where the cartridge data reading device 19 is disposed is opposite to each memory chip 13 of the cartridges 7 stored in the cartridge storage part 16. The cartridge data reading device 19 contactlessly reads data retained in the memory chips 13 and writes other information into the memory chips 13.

A pair of sliding pipes 38, 38 directed in the left-right direction is disposed in parallel on the bottom face of the moving box 36 integrated with the slide frame 30. These sliding pipes 38, 38 are externally tilted to a pair of guide rods 39, 39 parallely spanned between the left and right side plates 25, 25 in the housing 1 so as to slide in the left-right direction. Thus, the slide frame 30 and the moving box 36 are guided so as to move smoothly in the left-right direction.

An endless timing belt 41 is wound on a pair of pulleys 40, 40 disposed on both sides of the housing 1. A part of the endless timing belt 41 is fixed to the bottom face of the moving box 36 between the sliding pipes 38, 38.

Each shaft 40a of the pulleys 40 directed in the front-rear direction is pivotally supported by bearing members 42 in the housing 1. One of the shafts 40a is connected to a rotating shaft 43a of a motor 43 of which a rotation angle is controllable such as a stepping motor provided in the housing 1. Thus, the timing belt 41 is endlessly rotated by a torque of the motor 43, and the slide frame 30 and the moving box 36 fixed to a part of the timing belt 41 are moved in the left-right direction.

The left-right moving device 31 is composed by including the motor 43, the pulleys 40, 40 and the timing belt 41, and in a broad sense, it is also composed by including a guide means comprising the sliding pipes 38, 38 and the guide rods 39, 39.

Figure 7:
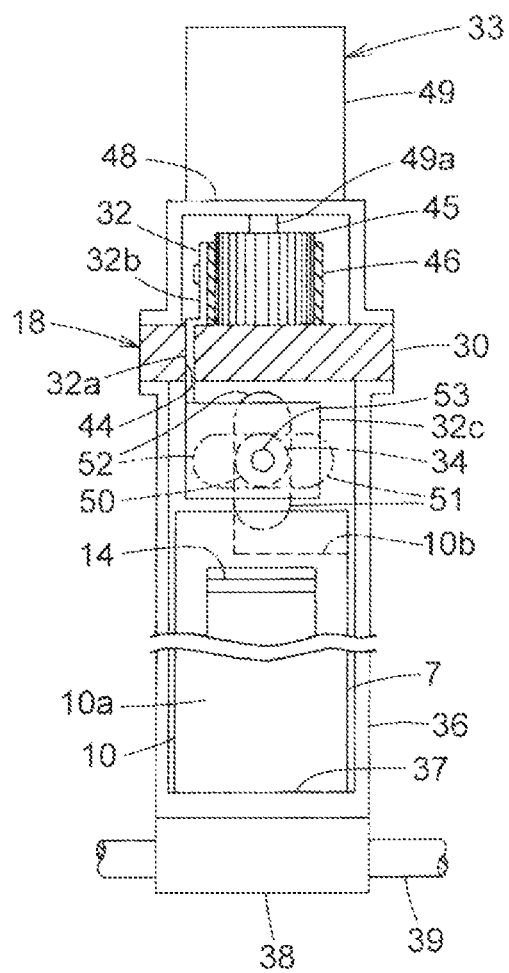
FIG. 7 is an enlarged vertical sectional front view taken along the line VII-VII in FIG. 5.

A slit 44 is formed on the slide frame 30 so as to extend from the vicinity of the front end to the back end in the front-rear direction (see FIGS. 2, 7). A vertically directed base 32a of the slider 32 is slidably fitted to this slit 44 in the front-rear direction.

Figure 6:
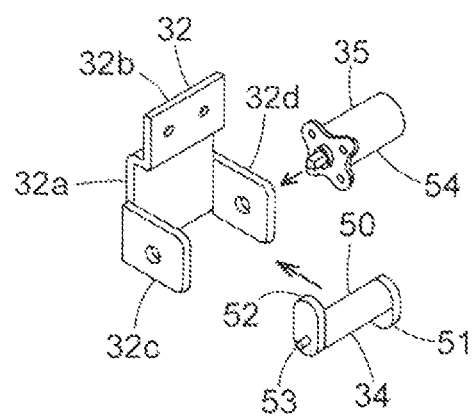
FIG. 6 is an exploded perspective view showing an engaging member and associated components of a cartridge transfer device of the first embodiment.

As shown in FIG. 7, a L-shape mounting part 32b in a front face view is continuously provided on atop of the base 32a of the slider 32 projecting upward from the slide frame 30. As shown in FIGS. 6, 7, a from part 32c and a rear part 32d directed in one side direction are continuously provided on both edges of a lower end part of the base 32a suspended from the slide frame 30.

A timing belt 46 is wound on a pair of pulleys 45,45 arranged on front and rear parts of the top face of the slide frame 30. A part of the timing belt 46 is fixed to an upper part of the mounting part 32b of the slider 32.

The front pulley 45 is pivotally supported by a vertical shaft 47 projected from the top face of the front part of the slide frame 30. A motor 49 of which a rotation angle is controllable such as a stepping motor is supported on a motor supporting part 48 provided on the rear end part of the slide frame 30. The rear pulley 45 is fixed to a lower end part of a rotating shaft 49a of the motor 49, wherein the rotating shaft 49a penetrates the above motor supporting part 48 and projects downward (see FIG. 7).

The timing belt 46 wound on the front and rear pulleys 45, 45 is endlessly rotated by a torque of the motor 49, the slider 32 fixed to a part of the timing belt 46 is moved in the front-rear direction. The front-rear moving device 33 is composed by including the motor 49, the pulleys 45, 45 and the timing belt 46, and in a broad sense, it is also composed by including a guide means comprising the slit 44.

The engaging member 34 comprises
a shaft 50 directed in the front-rear direction;
an engaging pawl 51 projecting from a rear end of the shaft 50 perpendicularly to the shaft 50; and
a pressing pawl 52 projecting from a front end of the shaft 50 perpendicularly to the shaft 50 so that it forms an angle of 90° or more to the engaging pawl 51 around the shall 50. In this example, the pressing pawl 52 projects so as to form an angle of 180° to the engaging pawl 51.

The engaging member 34 is pivotally supported by a supporting shaft 53 directed in the front-rear direction between the front part 32c and the rear part 32d of the slider 32, and is rotated by an engaging/disengaging driving device 35 fixed to a rear face of the rear part 32d. The engaging/disengaging driving device 35 comprises a motor 54 of which a rotation angle is controllable such as a stepping motor.

The engaging member 34 is rotated by the motor 54 among the following positions:

the engaged position at which the engaging pawl 51 is directed downward so as to engage with the concavity 10b formed on each of the cartridges 7 stored in the cartridge storage part 16,
the disengaged position at which the engaging pawl 51 is directed substantially in a horizontal direction so as to disengage from the concavity 10b of the cartridge 7, and
a pressing position at which the engaging pawl 51 is directed upward and the pressing pawl 52 is directed downward so that the pressing pawl 52 comes into contact with the front face of the cartridge 7.

A length of the shaft 50 of the engaging member 34, that is, an interval between the engaging pawl 51 and the pressing pawl 52 is almost the same as an interval between the front face of the cartridge 7 and the from concavity 10b. When the engaging member 34 is rotated to the pressing position by the motor 54 as shown with two dotted lines in FIG. 8 from the state that the engaging member 34 is positioned at the engaged position at which the engaging pawl 51 engages with the front concavity 10b of the cartridge 7 as shown with solid lines in FIG. 8; the engaging pawl 51 disengages from the front concavity 10b of the cartridge 7, and the pressing pawl 52 comes into contact with or comes close to the front face of the cartridge 7.

Figure 8:
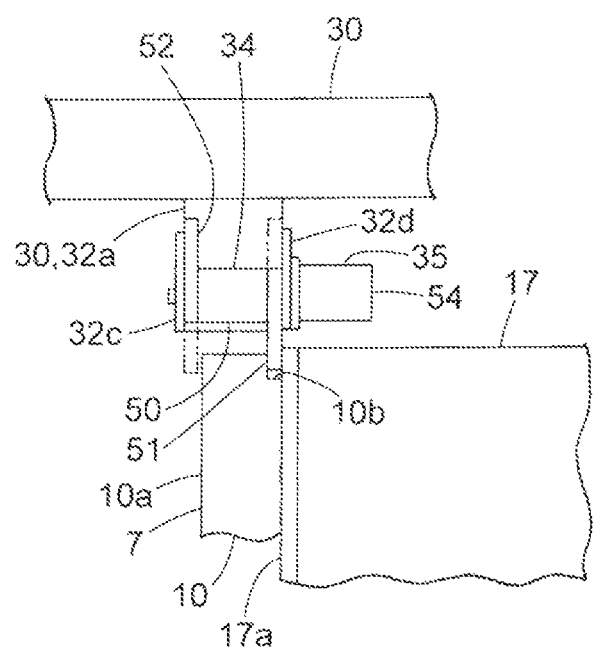
FIG. 8 is an enlarged side view showing an engaging member and associated components, in a slate that a slider of the first embodiment is moved to a drive mounting position.

As shown with solid lines in FIG. 3, the slider 32 is moved by the motor 49 among the following positions:
a front limit position at which the engaging pawl 51 engages with/disengages from the front concavity 10b on the top face of each of the cartridges 7 stored in the cartridge storage part 16,
a pulled-out position at which the cartridge 7 is positioned in the moving box 36 in the state that the engaging pawl 51 engages with the above concavity 10b (see two dolled lines in FIG. 3),
a drive mounting position at which each of the cartridges 7 is mounted to a cartridge mounting port 17a of any of the magnetic tape drives 17 as shown with solid lines in FIG. 8, and
a pressing position (not shown) at which the pressing pawl 52 is come into contact with the front face of the cartridge 7, and the cartridge 7 is pressed into the cartridge mounting port 17a of the magnetic tape drive 17.

Because a means for detecting each position of the slider 32 is publicly known, drawings and an explanation of the detecting means are omitted.

By this cartridge transfer device 18, each of the cartridges 7 is pulled out from the cartridge storage part 16 to be mounted to any of the magnetic tape drives 17, and is pulled out from any of the magnetic tape drives 17 to be returned to the original position in the cartridge storage part 16.

Moreover, the cartridge transfer device 18 transfers the cartridge 7 mounted in the loading box 28 from the gate 8 to a specific position in the cartridge storage part 16 or to any of the magnetic tape drives 17, and transfers the cartridge 7 stored in the cartridge storage part 16 or the cartridge 7 pulled out from any of the magnetic tape drives 17 to the loading box 28.

Its specific functions and operation modes are described below.

An air cleaner 55 is disposed at a rear face of the housing 1 so as to be detachable by engaging a pair of left/right hooks 59 pivotably supported by a shaft 58 directed in the left-right direction at a front upper part of the air cleaner 55 with a capitate engaging shaft 60 directed in the left-right direction provided at the rear part of the housing 1 in a state that a downward hook 56 provided at a lower part of a front face of the air cleaner 55 is engaged with a bracket 57 provided at the rear plate 3 of the housing 1. In another case, this air cleaner 55 may be disposed in the housing 1.

The air cleaner 55 has an inlet port 62 connected to an exhaust port 61 formed on the rear plate 3 of the housing 1, and an air outlet 64 connected to a cleaned air intake 63 on the rear plate 3 of the housing 1 in the state that the air cleaner 55 is mounted to the rear face of the housing 1. As schematically shown in FIG. 3, the air cleaner 55 supplies an air taken from the inlet port 62 to the housing 1 through the air outlet 64 by a fan 65 via various kinds of filters 66, a temperature/humidity regulator 67 regulating a temperature and a humidity at each set value, and a static-elimination-ion feeder 68, in this order.

It is preferable that a branch duct 69 is provided at the cleaned air intake 63 in the housing 1 to direct a part of the cleaned air including static elimination ions supplied by the air cleaner 55 to the magnetic tape drives 17, that when rewinding the magnetic tape 11 of the cartridge 7 in the magnetic tape drive 17, the cleaned air including static elimination ions is directly supplied to an atmosphere at a running part of the magnetic tape 11 taken out from the cartridge 7, and that the rest of the cleaned air is directly supplied in the housing 1 from a portion other than the branch duct 69 of the cleaned air intake 63.

In another case, the static-elimination-ion feeder 68 may be provided in the housing 1 independently from the air cleaner 55. In still another case, the branch duct 69 may be omitted.

Figure 9:
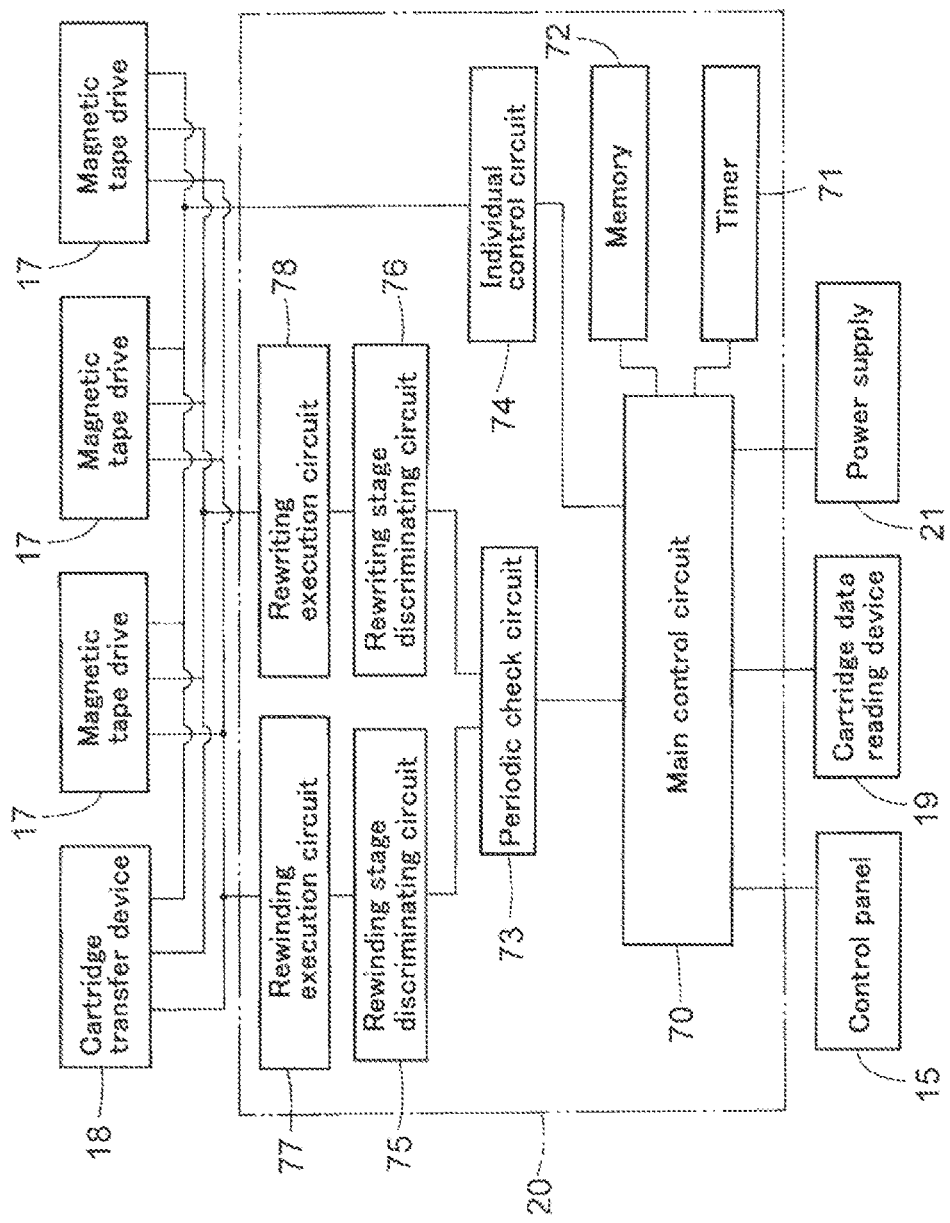
FIG. 9 is a block diagram of an electrical system of the first embodiment of a magnetic-tape storage apparatus of the present invention.

Based on a block diagram shown in FIG. 9, an electric system in the first embodiment of the magnetic-tape storage apparatus is explained.

An input side of the computer 20 as a controller is connected to the control panel 15, the cartridge data reading device 19 and the power supply 21. An output side of the computer 20 is connected to the cartridge transfer device 18 (specifically, the motors 43, 49, 54 and various kinds of sensors detecting positions of each moving member, the sensors being not shown in the drawings), and the magnetic tape drives 17 (specifically, their internal controllers).

Functions of the computer 20 are schematically shown in FIG. 9. The computer 20 comprises
a main control circuit 70,
a timer 71 and a memory 72 connected to the main control circuit 70,
a periodic check circuit 73 checking every cartridge 7 stored in the cartridge storage part 16 on a check date at a constant period such as once a week or once a month, and
an individual control circuit 74 individually performing contents of a command input from the operations of the control panel 15.

Incidentally, although the name "circuit" is respectively given to the main control circuit 70, the periodic check circuit 73, the individual control circuit 74, a rewinding stage discriminating circuit 75, a rewriting stage discriminating circuit 76, a rewinding execution circuit 77 and a rewriting execution circuit 78 in the computer 20 (the circuits 75 to 78 being described below); each of which does not have a concrete circuit structure, but corresponds to an expression of a specific function in the computer 20, and these circuits practically exists as a harmoniously integrated formation in a CPU.

The periodic check circuit 73 is activated when the main control circuit 70 detects that a check date counted by the timer 71 has arrived. The periodic check circuit 73 activates the cartridge transfer device 18, moves the cartridge data reading device 19 disposed on the front part 29 of the slide frame 30 of cartridge transfer device 18 to the position where the cartridge data reading device 19 faces to a memory chip 13 of a first cartridge 7 stored in the cartridge storage part 16, and reads data retained in the memory chip 13. Based on the data, the periodic check circuit 73 makes the rewinding stage discriminating circuit 75 discriminate about whether the cartridge 7 reaches to a rewinding stage of a tape or not, makes the rewriting stage discriminating circuit 76 discriminate about whether the error rate of the cartridge 7 reaches to a threshold at which the rewriting is necessary, and newly writes the check results into the memory chip 13 of the first cartridge 7. The same process is performed for the second to the last cartridges 7 in order.

The rewinding execution circuit 77 is activated when the rewinding stage discriminating circuit 75 detects that a cartridge 7 under checking has reached to the rewinding stage. The rewinding execution circuit 77 controls the cartridge transfer device 18 and any of the magnetic tape drives 17 so that the above cartridge 7 is automatically rewound. Its specific functions are described below.

When the above cartridge 7 is rewound, the rewinding performance record is newly written into the memory chip 13 of the above cartridge 7 by the magnetic tape drive 17 which performed the rewinding or the cartridge data reading device 19 to which the above cartridge 7 faces when it is returned to the original storage position in the cartridge storage part 16 after the rewinding.

The rewriting execution circuit 78 is activated when the rewriting stage discriminating circuit 76 discriminates that the error rate of the cartridge 7 under checking has reached to a threshold at which the rewriting is necessary. The rewriting execution circuit 78 controls the cartridge transfer device 18 and any of the two pieces of magnetic tape drive 17, 17 so that the above cartridge 7 is automatically rewritten. Its specific functions are described below.

When the above cartridge 7 is rewritten, the memory chip 13 of the unused new cartridge 7 is made to be retained not only an error rate obtained from a comparison between the reading information of the magnetic tape 11 of the before-rewritten cartridge 7 mounted to another magnetic tape drive 17 and the writing information to the magnetic tape 11 of the new cartridge 7, but also the data retained in the memory chip 13 of the before-rewritten cartridge 7 as the information of the former generation.

In the above circuit formation, the rewriting stage discriminating circuit 76 functions as a rewriting stage discriminator for discriminating that the error rate included in the error check history read by the cartridge data reading device 19 exceeds a predetermined threshold, and for outputting the information. The computer 20 comprising the rewriting stage discriminating circuit 76 functions as a rewrite controller.

Based on the block diagram shown in FIG. 9 and flowcharts shown in FIGS. 10-13, basic operations of the first embodiment are described.

Figure 10:
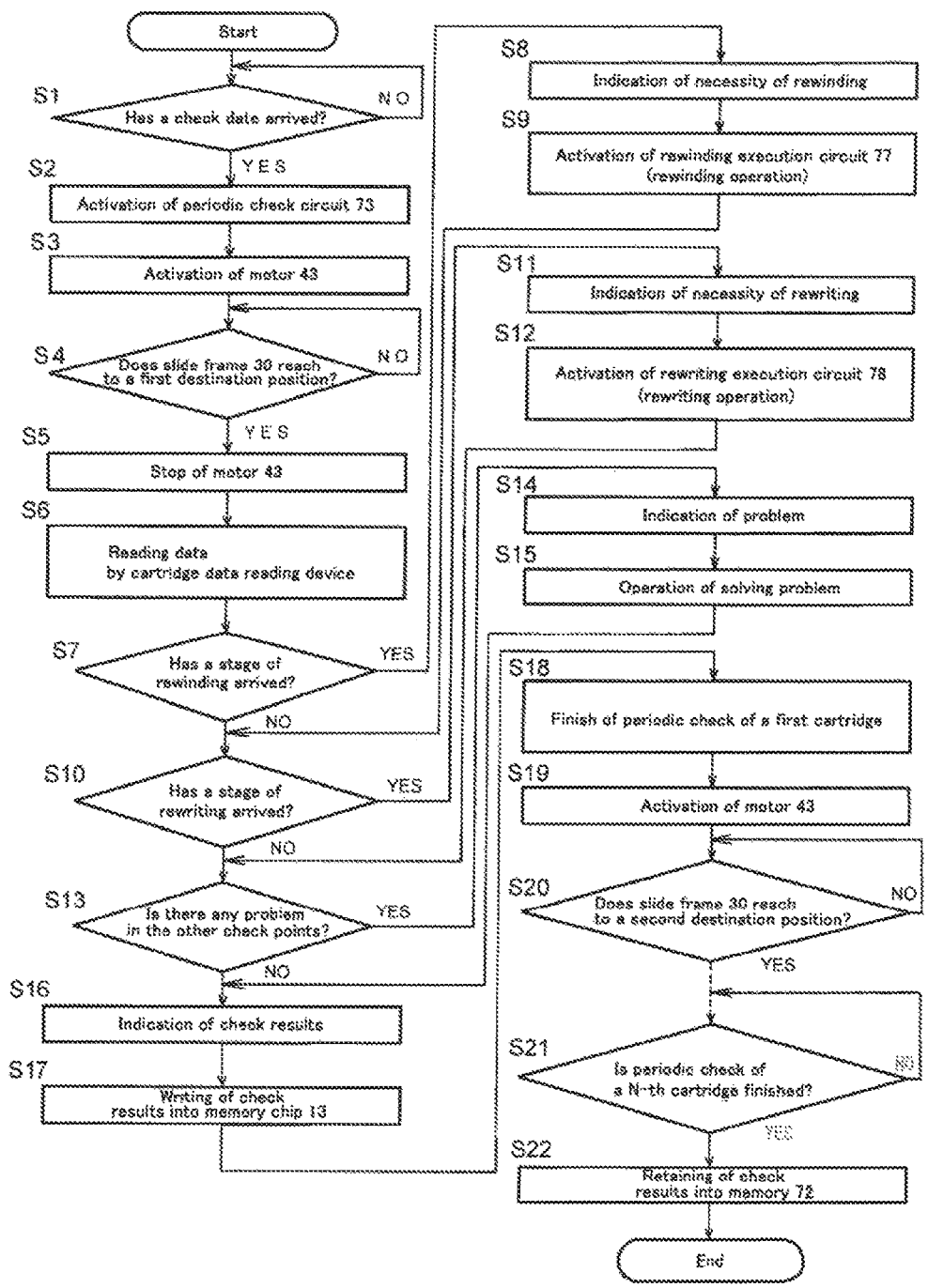
FIG. 10 is a flowchart showing a basic operation mode of the first embodiment of a magnetic-tape storage apparatus of the present invention.

As shown in FIG. 10, when a current time of the timer 71 reaches to a predetermined check date (S1), the periodic check circuit 73 is activated (S2).

Then, the motor 43 of the left-right moving device 31 of the cartridge transfer device 18 is activated (S3), the slide frame 30 is moved in the left-right direction. When the slide frame 30 reaches to a first destination position corresponding to a predetermined first cartridge 7 stored in the cartridge storage part 16 (S4), the motor 43 is stopped (S5).

The positioning at that time may be performed by attaching bar codes (not shown) presenting the first to the N-th to the positions corresponding to each of the cartridges 7 on the front plate 23 of the storage box 26 so that the bar codes are contactlessly read by a bar code reader (not shown) provided on the rear lace of the front part 29 of the slide frame 30 so as to face to the bar codes; or may be performed by other positioning means such as a linear encoder (not shown), etc.

Incidentally, with respect to position detecting means for the other moving members, their drawings and explanations are omitted to simplify the explanation.

After the motor 43 is slopped (S5), the cartridge data reading device 19 reads the data retained in the memory chip 13 of the cartridge 7 facing to the cartridge data reading device 19 (by interposing the from plate 23 of the storage box 26) (S6).

The data read by the cartridge data reading device 19 are sent to the main control circuit 70. After analyzing the data, the rewinding stage discriminating circuit 75 discriminates about whether the stored period between the last rewinding date and the current time exceeds the predetermined rewinding period (S7). When the stored period exceeds the rewinding period, the control panel 15 indicates a necessity of the rewinding (S8), and the rewinding execution circuit 77 is activated to start the rewinding (S9).

A flow of a specific rewinding operation by the rewinding execution circuit 77 is described below based on FIGS. 11, 12.

When the stored period does not exceed the rewinding period in the step (S7), the rewriting stage discriminating circuit 76 discriminates about whether the rewriting stage has arrived or not (S10).

The rewriting stage discriminating circuit 76 discriminates about whether the last error rate in the error check history included in the above data exceeds a predetermined threshold. When the last error rate exceeds the threshold, after indicating the necessity of the rewriting on the control panel 15 (S11) that the rewriting stage has arrived, the rewriting execution circuit 78 is activated to start the rewriting.

A flow of a specific rewriting operation by the rewriting execution circuit 78 is described below based on FIG. 13.

When the last error rate does not exceed the threshold in the step (S10), it is checked about whether there is no problem in the other checkpoints (S13). When there is a problem, after indicating the problem on the control panel 15 (S14), a solving problem operation is started (S15).

When there is no problem in the other checkpoints in the step (S13), after indicating the current check results on the control panel 15 (S16), the cartridge data reading device 19 newly writes the check results into the memory chip 13 of the cartridge 7 facing to the cartridge data reading device 19 (S17), and the periodic check of the first cartridge 7 is finished (S18).

After that, the motor 43 is activated again (S19), the slide frame 30 is moved to a second destination position corresponding to the second cartridge 7 (S20), and the same process is performed. In the same way, the slide frame 30 is respectively moved to a third to the N-th destination positions respectively corresponding to the third to the N-th cartridges 7, and the same process is repealed. After finishing the periodic check of the N-th cartridge 7 (S21), the check results are retained into the memory 72 (S22) and the periodic check is finished.

Figure 11:
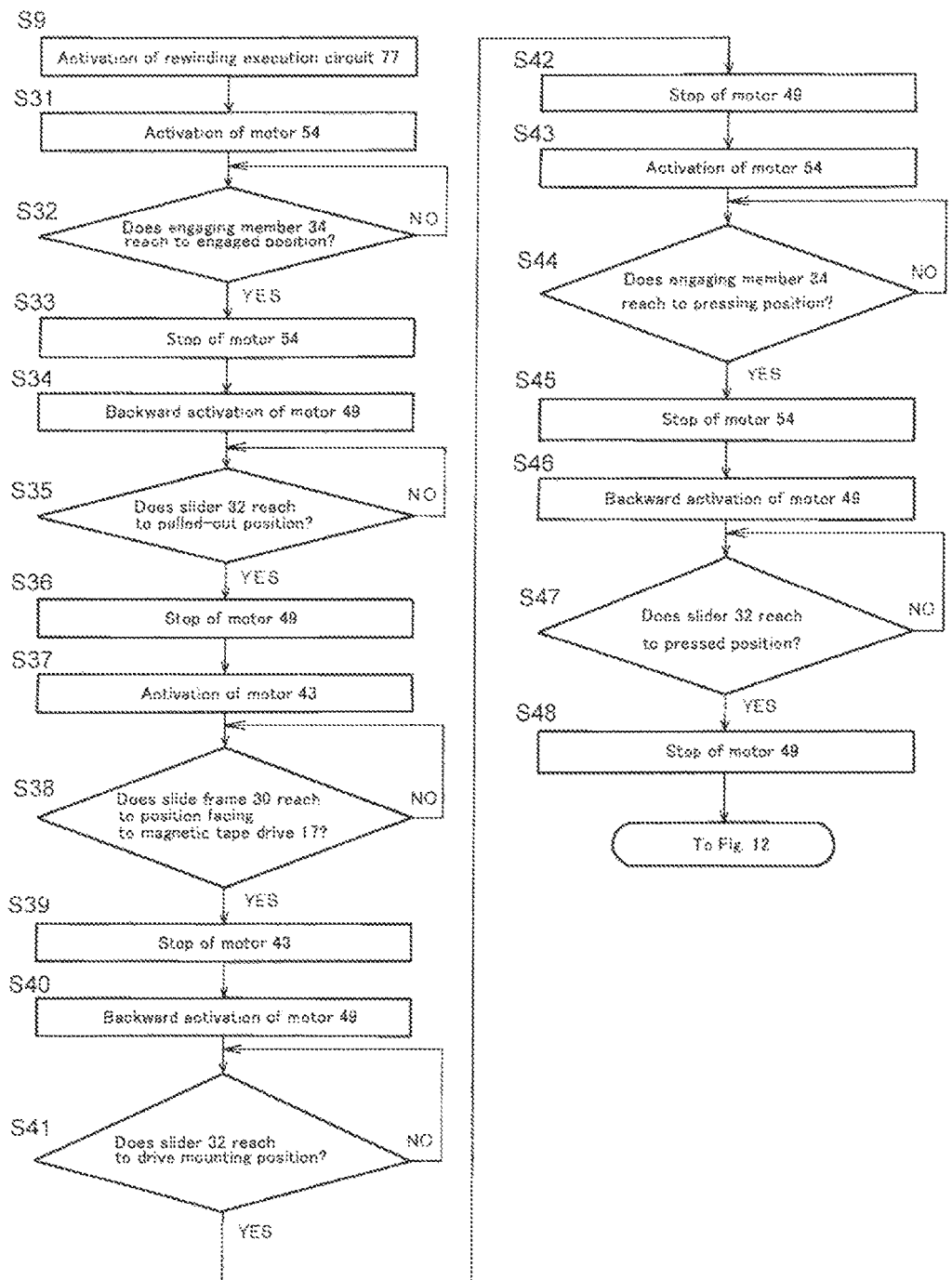
FIG. 11 is a first flowchart showing an operation mode when a magnetic tape is rewound.

In the step (S9), when the rewinding execution circuit 77 is activated, the motor 54 in the engaging/disengaging driving device 35 is activated as shown in FIG. 11 (S31). When the engaging member 34 reaches to the engaged position at which the engaging pawl 51 is directed downward (S32), the motor 54 is stopped (S33).

At that time, the slider 32 is positioned at the front limit position. When the engaging pawl 51 reaches to the engaged position, the engaging pawl 51 engages with the front concavity 10b on the top face of the cartridge 7 just under the engaging pawl 51.

Then, the motor 49 in the front-rear moving device 33 is activated backward (S34), and the slider 32 is moved backward. When the slider 32 reaches to the pulled-out position (S35), the backward operation of the motor 49 is stopped (S36).

While this process, the cartridge 7 is moved backward with the slider 32 in the state that the engaging pawl 51 engages with the concavity 10b, and is transferred from the storage box 26 to the moving box 36.

Then, the motor 43 of the left-right moving device 31 is activated (S37), and the slide frame 30 is moved in the left-right direction. When the slide frame 30 reaches to the position facing to a predetermined magnetic tape drive 17 (S38), the motor 43 is stopped (S39), and the slide frame 30 stops at that position.

Then, the motor 49 of the front-rear moving device 33 is activated backward again (S40), the slider 32 is moved backward. When the slider 32 reaches to the drive mounting position (S41), the backward operation of the motor 49 is stopped (S42).

In this duration, the cartridge 7 is inserted into the cartridge mounting port 17a of the magnetic tape drive 17 from the moving box 36.

Then, the motor 54 of the engaging/disengaging driving device 35 is activated (S43). When the engaging member 34 reaches to the pressing position at which the pressing pawl 52 is directed downward (S44), the operation of the motor 54 is stopped (S45).

In this duration, the engaging pawl 51 of the engaging member 34 is directed upward to disengage from the concavity 10b of the cartridge 7. On the contrary, the pressing pawl 52 is directed downward to face to the front face of the cartridge 7.

From this state, the motor 49 of the front-rear moving device 33 is activated backward again (S46). When the slider 32 is moved backward, the front face of the cartridge 7 is pressed backward by the pressing pawl 52 to be inserted into the cartridge mounting port 17a. When the slider 32 reaches to the pressed position (S47), the backward operation of the motor 49 is stopped (S48).

At that time, the pressing pawl 52 is stopped at a position where the pressing pawl 52 comes into contact with or comes close to the cartridge mounting port 17a of the magnetic tape drive 17. The pressing pawl 52 can prevent the cartridge 7 from getting out from the cartridge mounting port 17a even if an earthquake occurs.

Figure 12:
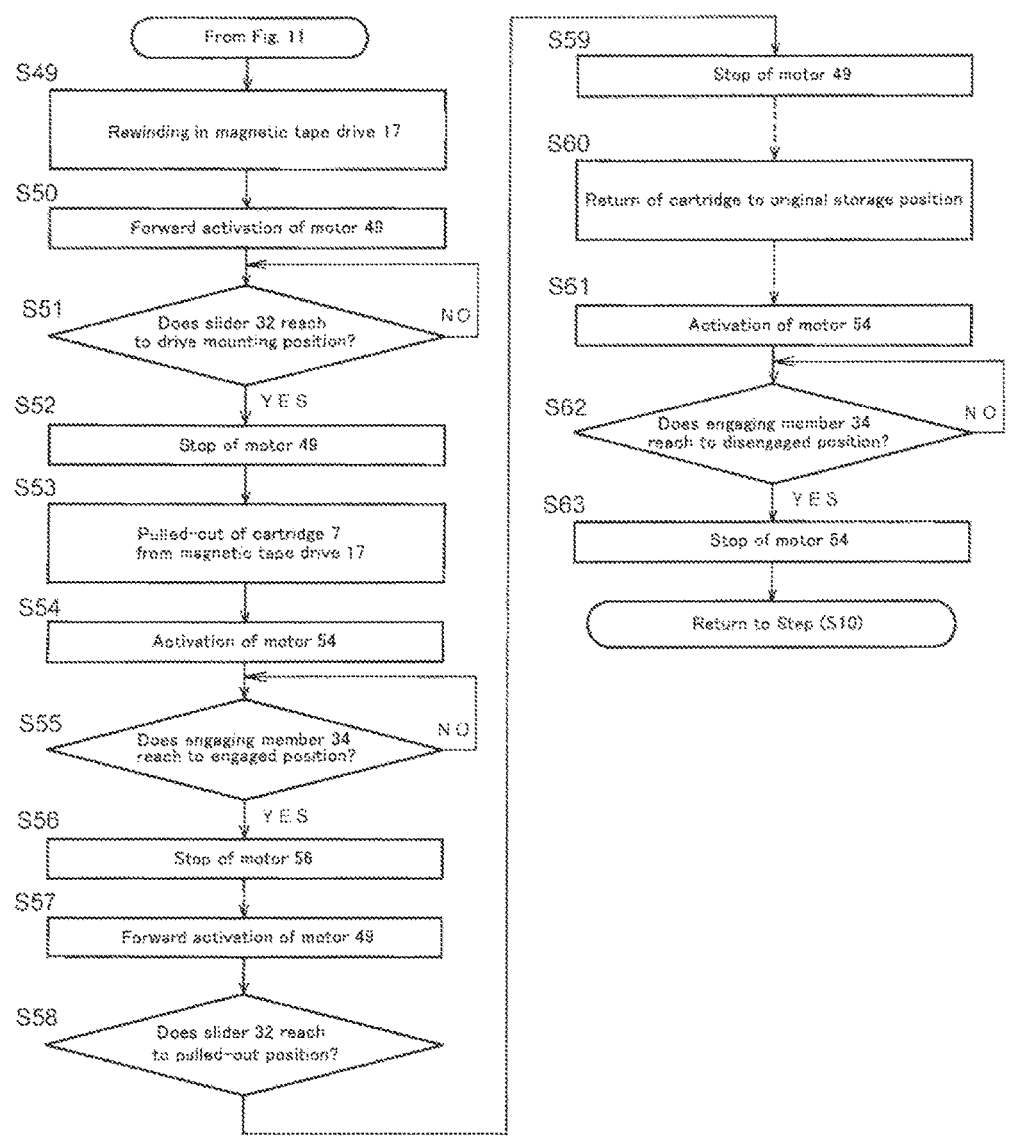
FIG. 12 is a second flowchart showing an operation mode when a magnetic tape is rewound.

After that, as shown in FIG. 12, the magnetic tape 11 of the cartridge 7 is rewound in the magnetic tape drive 17 (S49). Because the rewinding operation is publicly known, a detailed explanation of it is omitted.

When the rewinding in the magnetic tape drive 17 is finished, the motor 49 of the front-rear moving device 33 is activated forward (S50). When the slider 32 reaches to the drive mounting position (S51), the forward operation of the motor 49 is stopped (S52).

Then, the cartridge 7 of which the rewinding is finished is pulled out from the cartridge mounting port 17a of the magnetic tape drive 17 (S53). After the front face of the cartridge 7 comes into contact with the pressing pawl 52, the motor 54 of the engaging/disengaging driving device 35 is activated (S54). When the engaging member 34 reaches to the engaged position at which the engaging pawl 51 is directed downward (S55), the motor 54 is stopped (S56).

In this duration, the pressing pawl 52 of the engaging member 34 is directed upward to detach from the front face of the cartridge 7. On the contrary, the engaging pawl 51 is directed downward to engage with the concavity 10b of the cartridge 7.

Then, the motor 49 of the front-rear moving device 33 is activated forward (S57), the slider 32 is moved forward, and the cartridge 7 is also moved forward to be stored in the moving box 36. When the slider 32 reaches to the pulled-out position (S58), the forward operation of the motor 49 is stopped (S59).

After that, by following a path opposite to the above steps (S34) to (S39), that is, after the slide frame 30 is moved in the left-right direction by the left-right moving device 31 to a position corresponding to the original storage position of the held cartridge 7 in the storage box 26, the held cartridge 7 is returned to the original storage position in the storage box 26 by the front-rear moving device 33 (S60), the motor 54 of the engaging/disengaging driving device 35 is activated (S61), the engaging member 34 reaches to the disengaged position at which the engaging pawl 51 is directed horizontally (S62), the rewinding is finished by stopping the motor 54 (S63), and it is returned to the step (S10).

Figure 13:
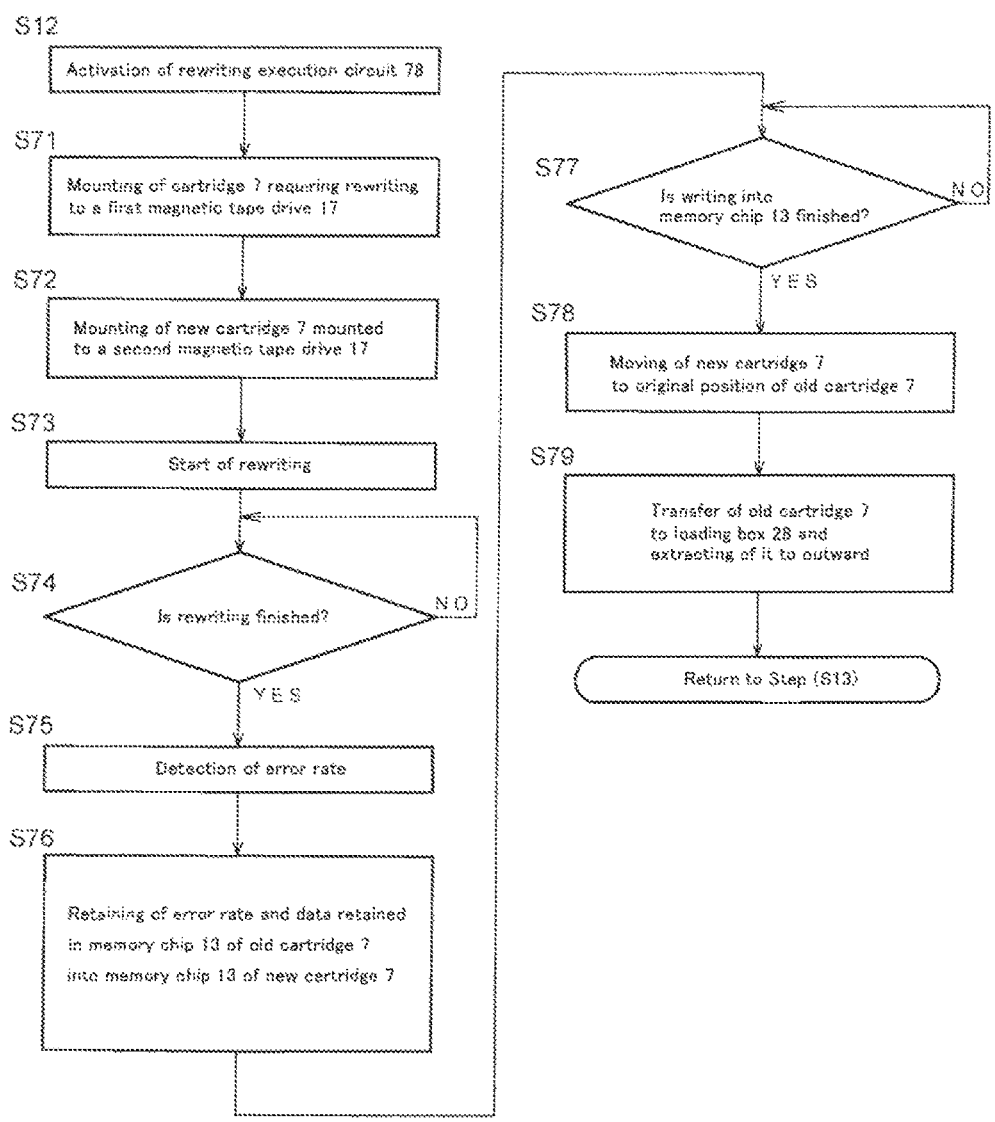
FIG. 13 is a flowchart showing an operation mode when a magnetic tape is rewritten.

In the step (S12), when the rewriting execution circuit 78 is activated, as shown in FIG. 13, the cartridge 7 requiring rewriting (hereinafter referred to as "old cartridge") is mounted to the first magnetic tape drive 17 (S71) from the storage box 26 in the same way as the steps (S31) to (S49). Then, the unused new cartridge 7 (hereinafter referred to as "new cartridge") mounted to another position in the storage box 26 or mounted to the loading box 28 is mounted to a second magnetic tape drive 17 (S72) in the same way as the steps (S31) to (S49), and the rewriting is started (S73).

This rewriting is performed by reading the recorded data in the magnetic tape 11 of the old cartridge 7 mounted to the first magnetic tape drive 17 and by recording the read data into the magnetic tape 11 of the new cartridge 7 mounted to the second magnetic tape drive 17. When the rewriting is finished (S74), the error rate is discriminated by comparison between the current reading information by the first magnetic tape drive 17 and the current writing information by the second magnetic tape drive 17 (S75). The error rate is retained into the memory chip 13 of the new cartridge 7, and the data including the error rate history retained in the memory chip 13 of the old cartridge 7 are also retained as the information of the former generation (S76).

When the writing into the memory chip 13 of the new cartridge 7 is finished (S77), the new cartridge 7 is moved by the cartridge transfer device 18 to the position corresponding to the original position where the old cartridge 7 had been stored in the storage box 26 (S78), the old cartridge 7 is transferred to the loading box 28 by the cartridge transfer device 18 (S79) and is extracted from the housing 1 through the gate 8 of the housing 1, the rewriting is finished, and it is returned to the step (S13).

Because the error check method of the cartridges 7 is publicly known, an explanation of it is omitted.

As apparent from the above, according to the first embodiment, the cartridge transfer device 18 is activated timely or at a predetermined period, the data retained in each memory chip 13 of the cartridges 7 stored in the cartridge storage part 16 are contactlessly read by the cartridge data reading device 19 provided on the cartridge transfer device 18, the cartridge 7 requiring rewinding is found by the computer 20 based on the data, thus the cartridge 7 is transferred to any of the magnetic tape drives 17 by the cartridge transfer device 18, and the magnetic tape 11 in the cartridge 7 is automatically rewound.

In the duration of this rewinding, because an accumulated stress of each of the magnetic tape 11 is released, and each of the magnetic tape 11 is activated by temporally exposed to an atmosphere in the housing 1; a durability of each of the magnetic tape 11 in the cartridges 7 is increased.

Therefore, the magnetic tapes 11 on each of which valuable data are recorded and the recorded data on them can be surely stored at a low cost and over a long period in a small space.

Moreover, because the cartridge data reading device 19 can contactlessly read the data retained in each memory chip 13 of the cartridges 7, it can read the information of each memory chip 13 of the cartridges 7 efficiently and quickly without inserting/removing each of the cartridges 7 into/from the storage places.

The static-elimination-ion feeder 68 is provided to the housing 1. It supplies an air including static elimination ions to an atmosphere at a running part of a running magnetic tape 11 pulled out from a cartridge 7 when rewinding the magnetic tape 11 of the cartridge 7. Thus, it can prevent an influence by a static electricity generated at the time of rewinding of the magnetic tape 11. Thus, it can prevent a harmful effect on the data recorded on the magnetic tape 11 by the static electricity, and an attachment of undesirable fine particles such as dust to the magnetic tape 11.

The rewriting stage discriminating circuit 76 discriminates that the error rale included in the error check history exceeds the predetermined threshold. Thus, it is possible to know that the magnetic tape 11 is in a state of requiring a maintenance or exchange.

Moreover, before the data recorded on the magnetic tape 11 are deteriorated to an unusable state, the rewriting execution circuit 78 automatically rewrites the data on the magnetic tape 11 of the unused new cartridge 7. Thus, a recording medium is renewed, and it is possible to retain the data in a long period beyond a lifetime of the magnetic tape 11.

When rewriting, not only the error rate at the time of rewriting, but also the information retained in the memory chip 13 of the cartridge 7 before rewriting is retained as the information of the former generation into the memory chip 13 of the new cartridge 7. Thus, it is possible to exactly know an increasing state of the error rate retroactive to the cartridge 7 before rewriting.

The gate 8 through which a cartridge 7 can be inserted and removed is provided to the housing 1. Moreover, the cartridge transfer device 18 is capable of transferring the cartridge 7 inserted through the gate 8 to the cartridge storage part 16 or the magnetic tape drive 17, transferring the cartridge 7 stored in the cartridge storage part 16 or mounted to the magnetic tape drive 17 to the gate 8, and extracting the cartridge 7 to the outside through the gate 8. Thus, the cartridge 7 stored in the cartridge storage part 16 in the housing 1 can be inserted into/removed from the housing 1 and can be exchanged as necessary, the original cartridge 7 of which the data have been rewritten can be removed from the magnetic tape drive 17 or the cartridge storage part 16 and extracted from the housing 1, and the unused new cartridge 7 can be inserted into the magnetic tape drive 17 or the cartridge storage part 16 in the housing 1 from outside of the housing 1.

Because the cartridge transfer device 18 has the above formation; each of the cartridges 7 can be easily transferred from the base plate 22 to the moving receiving member 37 by engaging the engaging member 34 with the concavity 10b provided on each of the cartridges 7 and moving the engaging member 34 backward together with the slider 32 with the use of the front-rear moving device 33, and each of the cartridges 7 can be transferred in the left-right direction by moving the slide frame 30 in the left-right direction with the use of the left-right moving device 31 in the slate that each of the cartridges 7 is moved to the moving receiving member 37.

Moreover, each of the cartridges 7 mounted on the moving receiving member 37 can be easily and quickly transferred to the base plate 22 of the cartridge storage part 16 by moving the engaging member 34 forward together With the slider 32 with the use of the front-rear moving device 33 in the slate that the engaging member 34 engages with the concavity 10b of the cartridge 7.

Moreover, it is possible to simplify a structure of the cartridge transfer device 18 and to reduce the manufacturing cost of it.

The engaging member 34 has the shaft 50 directed in the front-rear direction and the engaging pawl 51 projecting from an end of the shaft 50 perpendicularly to the shaft 50, and the engaging/disengaging driving device 35 rotates the shaft 50 so that the engaging pawl 51 can rotate between the engaged position at which it engages with the concavity 10b provided on each of the cartridges 7 and the disengaged position at which it disengages from the concavity 10b of each of the cartridges 7. Therefore, it is possible to simplify a structure of the engaging member 34, to manufacture it at a low cost, and to simplify the operation of it.

The magnetic tape drives 17 are arranged backward from the moving receiving member 37 in the housing 1 so that the cartridge mounting port 17a is directed forward, the engaging member 34 is formed to have the pressing pawl 52 projecting from another end of the shaft 50 perpendicularly to the shaft 50 so that it forms an angle of 90° or more to the engaging pawl 51 around the shaft 50, and the engaging/disengaging driving device 35 can rotate the engaging member 34 in the state that the engaging pawl 51 disengages from the concavity 10b of the cartridge 7 to the pressing position at which the pressing pawl 52 can come into contact with the front face of the cartridge 7. Therefore, after the cartridge 7 mounted on the moving receiving member 37 is aligned with the cartridge mounting port 17a of any of the magnetic tape drives 17, the slider 32 is moved backward in the state that the engaging pawl 51 of the engaging member 34 engages with the concavity 10b of the cartridge 7, the cartridge 7 can be inserted into the cartridge mounting port 17a of the magnetic tape drive 17 until the engaging pawl 51 of the engaging member 34 comes into contact with or comes close to the front face of the magnetic tape drive 17. Then, the cartridge 7 can be deeply inserted into the cartridge mounting port 17a of the magnetic tape drive 17 by rotating the engaging member 34 to the pressing position with the use of the engaging/disengaging driving device 35 such that the pressing pawl 52 is opposite to the front face of the cartridge 7, and by moving the slider 32 backward further in that state.

Moreover, it is possible to prevent the cartridge 7 from getting out from the cartridge mounting port 17a by keeping the pressing pawl 52 of the engaging member 34 to stop at the position where it comes into contact with or comes close to the cartridge mounting port 17a after inserting the cartridge 7 into the cartridge mounting port 17a of the magnetic tape drive 17. That is, the pressing pawl 52 functions as a stopper for preventing the cartridge 7 from getting out.

Figure 14:
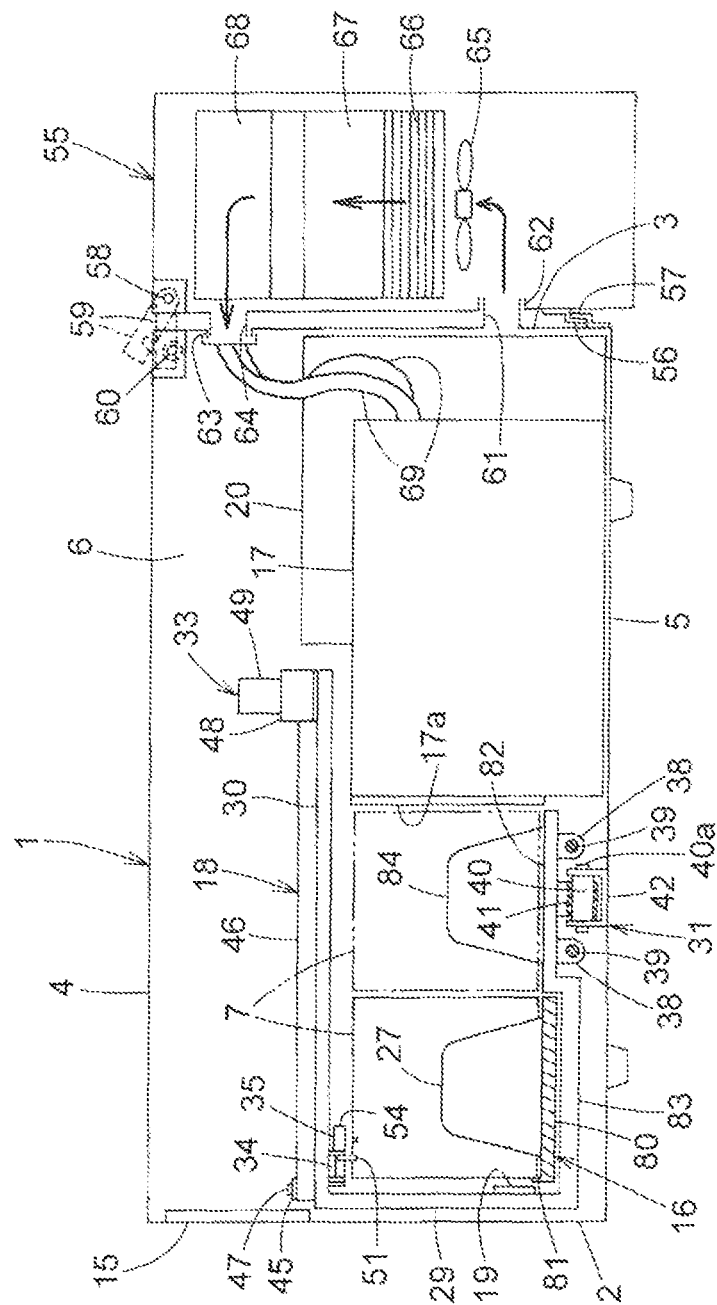
FIG. 14 is a vertical sectional side view similar to FIG. 3, which shows a second embodiment of a magnetic-tape storage apparatus of the present invention.

FIG. 14 shows a second embodiment of a magnetic-tape storage apparatus of the present invention. Incidentally, the same numerical references are attached to the same or similar members with those in the first embodiment in the drawings. Thus, a detailed explanation about them is omitted. In the second embodiment, alternative to the storage box 26 of the first embodiment, the cartridge storage part 16 is formed to comprise a horizontal base plate 80 directed in the left-right direction and spanned between the left and right side plates 6, 6 in the housing 1, an erect part 81 disposed on the front end of the base plate 80, and a plurality of partition plates 27.

With respect to the cartridge transfer device 18, the moving box 36 of the first embodiment is omitted; alternatively, the front part 29 of the slide frame 30 is elongated downward, and the lower end of the front part 29 and the frontend of the moving receiving member 82 which is the same as the moving receiving member 37 of the moving box 36 of the first embodiment are connected by a connecting part 83 directed in the front-rear direction and disposed under the base plate 80 so that the slide frame 30 and the moving receiving member 82 are integrated.

A pair of left and right partition plates 84 (only one of them being shown) are vertically arranged on the both left and right side edges of the moving receiving member 82, which prevent the cartridge 7 mounted on the moving receiving member 82 from inclining sideward.

In the second embodiment, it is possible to operate and to provide effects in the same way as the first embodiment.

The present invention is not restricted to the above embodiments, and various modifications may be added to the present invention unless deviating from the scope of Claims as follows.

(1) When a cartridge 7 is cheeked regarding errors by any of the magnetic tape drives 17, and the magnetic tape drive 17 discriminates that the error rate exceeds a predetermined threshold; in the state that the cartridge 7 (it is referred as "old cartridge" below) is mounted to the magnetic tape drive 17, an unused new cartridge 7 (it is referred as "new cartridge" below) is mounted to another magnetic tape drive 17, and rewriting is performed between the above old cartridge 7 and the new cartridge 7 in the same way as the above so that not only the error rate at the time of rewriting but also data retained in the memory chip 13 of the cartridge 7 before rewriting are retained to the memory chip 13 of the new cartridge 7 as information of the former generation.

(2) A pair of guide rods 39, 39 are parallely spanned between the left and right side plates 6, 6 above the slide frame 30 in the housing 1, sliding pipes 38, 38 are externally fitted to the guide rods 39, 39 respectively so as to be slidable, the sliding pipes 38, 38 are integrated with the slide frame 30 directly or with the use of suspension rods, so that the slide frame 30 is guided below the sliding pipes 38, 38 so as to move in the left-right direction.

(3) The left-right moving device 31 is disposed above the slide frame 30. That is, left and right pulleys 40, 40 are pivotally supported on left and right side plates 6, 6 respectively at the same or higher level with the slide frame 30 in the housing 1, a lower running part of the endless timing belt 41 wound on the pulleys 40, 40 is fixed to the slide frame 30, and an upper running part of it is set above the timing belt 46.

(4) The slide frame 30 is disposed below the cartridge storage part 16 so as to move in the left-right direction. In this case, the engaging member 34 is disposed so as to selectively engage with/disengage from the concavity 10*b* formed on the bottom face of the cartridges stored in the cartridge storage part.

What is claimed is:

1. A magnetic-tape storage apparatus comprising
a housing;
a cartridge storage part provided in the housing to store a plurality of cartridges respectively having a wound magnetic tape and a memory chip which can be read contactlessly;
a magnetic tape drive provided in the housing to perform reading, writing and rewinding of each magnetic tape of the cartridges;
a cartridge transfer device provided in the housing to selectively transfer each of the cartridges stored in the cartridge storage part to the magnetic tape drive and to return the transferred cartridge to an original position;
a cartridge data reading device disposed on the cartridge transfer device to selectively and contactlessly read data retained in each memory chip of the cartridges stored in the cartridge storage part; and
a controller provided to the housing to control the magnetic tape drive and the cartridge transfer device so that a cartridge requiring rewriting is found based on the data read by the cartridge data reading device, and that a magnetic tape of the found cartridge is rewound;
wherein each memory chip of the cartridges retains a rewinding history of the corresponding cartridge;
wherein the cartridge storage part stores the cartridges aligned in the left-right direction on a base plate;
wherein the cartridge transfer device comprises
a slide frame directed in the front-rear direction and provided in the housing so as to move in the left-right direction above or below the cartridges stored in the cartridge storage part,
a left-right moving device moving the slide frame in the left-right direction,
a slider mounted on the slide frame so as to move in the front-rear direction,
a front-rear moving device moving the slider in the front-rear direction along the slide frame,
an engaging member disposed on the slider and selectively engaging with/disengaging from a concavity formed on the top face of each of the cartridges stored in the cartridge storage part,
an engaging/disengaging driving device moving the engaging member between an engaged position at which the engaging member engages with the concavity of each of the cartridge and a disengaged position at which the engaging member disengages from the concavity, and
a moving receiving member integrally formed with the slide frame so as to be positioned behind the base plate, and receiving a cartridge moved to behind the base plate by engaging the engaging member with the concavity;
and wherein the cartridge data reading device on the slide frame is disposed at a position facing to a memory chip of the cartridges stored in the cartridge storage part.

2. The magnetic-tape storage apparatus according to claim 1, wherein the engaging member has a shaft directed in the front-rear direction and an engaging pawl projecting from an end of the shaft perpendicularly to the shaft, and wherein the engaging pawl can rotate between the engaged position at which it engages with the concavity provided on each of the cartridges and the disengaged position at which it disengages from the concavity of each of the cartridges by rotating the shaft with the use of the engaging/disengaging driving device.

3. The magnetic-tape storage apparatus according to claim 2, wherein the magnetic tape drive is disposed behind the moving receiving member in the housing so that a cartridge mounting port of the magnetic tape drive is directed forward, wherein the engaging member has a pressing pawl projecting from another end of the shaft perpendicularly to the shaft so that it forms an angle of 90° or more to the engaging pawl around the shaft, and wherein the engaging/disengaging driving device rotates the engaging member in the state that the engaging pawl disengages from the concavity of the cartridge to the pressing position at which the pressing pawl can come into contact with the front face of the cartridge.

4. The magnetic-tape storage apparatus according to claim 1, wherein a gate for inserting/extracting a cartridge is provided to the housing, and wherein the cartridge transfer device has functions to transfer a cartridge inserted through the gate from outside to the cartridge storage part or the magnetic tape drive, and to transfer a cartridge stored in the cartridge storage part or mounted on the magnetic tape drive to the gate so as to be extracted to outside.

* * * * *